(12) United States Patent
Perez (10) Patent No.: US 10,379,700 B1
(45) Date of Patent: Aug. 13, 2019

(54) SYSTEMS AND METHODS FOR CUSTOMIZED APPLICATIONS

(75) Inventor: Irene O. Perez, Floresville, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 948 days.

(21) Appl. No.: 11/875,335

(22) Filed: Oct. 19, 2007

Related U.S. Application Data (60) Provisional application No. 60/932,973, filed on Oct. 19, 2006.

(51) Int. Cl.
*G06F 3/0482* (2013.01)
*G06F 16/11* (2019.01)

(52) U.S. Cl.
CPC .......... *G06F 3/0482* (2013.01); *G06F 16/116* (2019.01)

(58) Field of Classification Search
CPC ..... G06F 17/243; G06F 16/116; G06F 3/0482
USPC ............................ 707/802, 803, 804, 999.01
See application file for complete search history.

(56) References Cited

U.S. PATENT DOCUMENTS

| | | | | |
|---|---|---|---|---|
| 6,314,415 | B1* | 11/2001 | Mukherjee | G06F 9/4443 706/45 |
| 6,651,217 | B1* | 11/2003 | Kennedy | G06F 17/243 715/224 |
| 6,928,451 | B2* | 8/2005 | Mogi et al. | 707/718 |
| 7,636,742 | B1* | 12/2009 | Olavarrieta | G06F 17/30395 |
| 2002/0120474 | A1* | 8/2002 | Hele | G06Q 10/10 705/4 |
| 2002/0120628 | A1* | 8/2002 | Hitchcock et al. | 707/100 |
| 2002/0174000 | A1* | 11/2002 | Katz et al. | 705/7 |
| 2003/0036926 | A1* | 2/2003 | Starkey et al. | 705/3 |
| 2003/0154085 | A1* | 8/2003 | Kelley | G06F 17/243 704/275 |
| 2005/0080649 | A1* | 4/2005 | Alvarez et al. | 705/1 |
| 2005/0231739 | A1* | 10/2005 | Lee et al. | 358/1.1 |
| 2005/0278200 | A1* | 12/2005 | Brawley et al. | 705/4 |
| 2006/0184933 | A1* | 8/2006 | Chessell | G06F 8/20 717/177 |
| 2007/0022027 | A1* | 1/2007 | Gupta et al. | 705/35 |
| 2007/0074153 | A1* | 3/2007 | Brothers et al. | 717/106 |
| 2007/0250783 | A1* | 10/2007 | Wu et al. | 715/762 |

(Continued)

OTHER PUBLICATIONS

"", *Streamlining Insurance Applications with Adobe*, Solution Brief, Adobe Systems, Inc., (2005), 3 p.

(Continued)

*Primary Examiner* — Arpan P. Savla
*Assistant Examiner* — Soheila (Gina) Davanlou
(74) *Attorney, Agent, or Firm* — Fletcher Yoder P.C.

(57) ABSTRACT

Systems and articles for customized applications are described. The system comprises at least one database having previously-obtained information, an assessment module communicable attached to the at least one database communicably attached to the at least one database, wherein the assessment module is configured to identify requisite data based on the previously-obtained information in the at least one database, and an application-generating module communicably attached to the at least one database, wherein the application-generating module is configured to generate an application based on requisite data in the at least one database. Other embodiments may be described and claimed.

22 Claims, 5 Drawing Sheets

(56) References Cited

U.S. PATENT DOCUMENTS

2008/0183486 A1* 7/2008 Baumgarten et al. ............ 705/1
2008/0228479 A1* 9/2008 Prado ............................ 704/235

OTHER PUBLICATIONS

"", *Adobe Solutions for Document Generation*, Business White Paper, Adobe Systems, Inc., (2005), 8 p.

"", *Safeco Deploys Adobe Solutions to Enhance Agent Services and Eliminate the Costs and Delays of Labor-Intensive Paper Processes*, Business Brief, Adobe Systems, Inc., (2003), 2 p.

"Adobe Solutions for Insurance Applications", [Online]. Retrieved from the internet: <URL: http://www.adobe.com/financial/insurance applications.html>, (2006), 2 p.

"Chubb Deploys Technology to Simplify and Customize E&O Application Process", [Online]. Retrieved from the internet: <URL:http://www.chubb.com/marketing/chubb1800.html>, News Release, (Sep. 16, 2004), 2 p.

"Compare Our Services", [Online]. Retrieved from the internet: <URL:http://www.reoadvisors.com/compare.php>, (2004), 3 p.

"John Hancock Simplifies Life Insurance Application Process for Producers", [Online]. Retrieved from the internet: <URL: http://biz.yahoo.com/prnews/>, Press Release, (Aug. 24, 2006), 3 p.

"Term Insurance Marketers: RBC ExpressTERM", [Online]. Retrieved from the internet: <URL: http://www.rbcinsurance.com/us/directicid-62016.html>, (Sep. 8, 2006), 2 p.

\* cited by examiner

DATA COLLECTION SYSTEM

FIG. 3

ADDITIONAL EMBODIMENT DATA
COLLECTION SYSTEM

FIG. 4

SOFTWARE METHOD

SYSTEMS AND METHODS FOR CUSTOMIZED APPLICATIONS

CROSS REFERENCES

This application claims the benefit of U.S. provisional application Ser. No. 60/932,973, titled "SYSTEMS AND METHODS FOR CUSTOMIZED APPLICATIONS", filed on Oct. 19, 2006.

TECHNICAL FIELD

Various embodiments described herein relate to program applications generally, and more particularly to systems and methods for customized applications.

BACKGROUND

Many entities offer service programs (hereinafter "programs") upon completion of an application process by an applicant. The applicant generally applies following the initial solicitation of participation by either party and the narrowing down of program choices and options. The application is chosen to match the applicant with the particular program, dispersed to the applicant, completed, and returned to the entity. The application often solicits a wide variety of personal information of the applicant, which, after submission, may be verified, and the applicant is either accepted or rejected as appropriate for the particular program based on the information provided. Following this process, either the application itself or just the information found on the application may be filed.

This type of application process is used in multiple types of service-providing entities, not limited to banking, property leases, insurance sales, and some types of product and property sales. Much of the information that is solicited is consistent across many different types of services, while some of the information is particular to the service that will be rendered. The application itself is generally specific to the particular program being considered, so an entity offering multiple programs has at least one form per program.

SUMMARY

Systems and methods for customizing an application are described. Using software, for example, the application is customized, including substantially populating the application with applicant data, based on the particular program and specific applicant data. Applicant data may be obtained from at least one database where applicant may have submitted data previously for any other reason, such as an alternate program application. The application need only be verified, signed, and returned in order to substantially complete the applicant's role in the application process. At that point the verified, signed, and returned application may be saved by the entity for record keeping purposes. Other embodiments are also described.

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and operating environment.

System Level Overview

Figure 1:
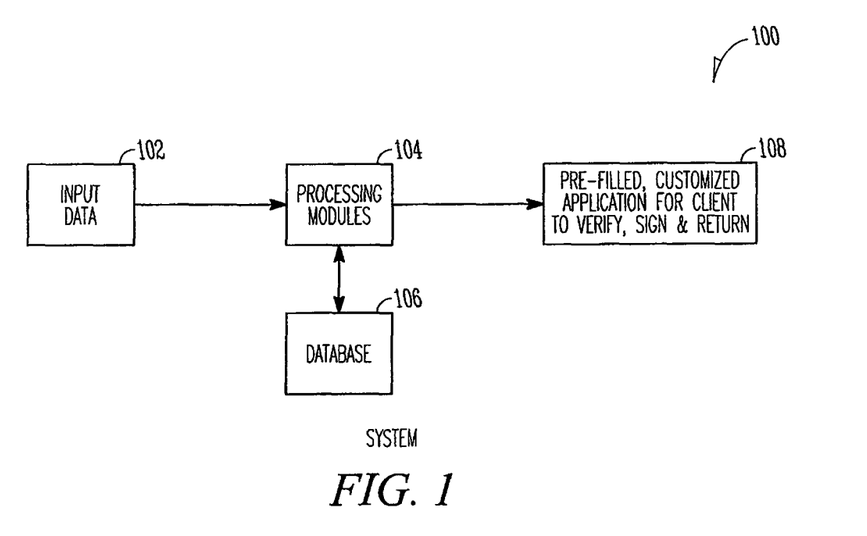
FIG. 1 is a block diagram of a system for customizing an application according to various embodiments.

FIG. 1 is a diagram of a system for customizing an application 100 according to various embodiments. The system comprises input data 102, processing modules 104, at least one database 106, and one or more substantially populated, customized applications 108.

Input data 102 represents data that may be required by an application process for a particular program (hereinafter "requisite data"), and may be entered into the system 100 by a user and through a user interface, for example. The user could be an applicant to the program or a representative of an entity (also referred to as a "member service representative"). The input data 102 may change depending on the particular program that is being applied for, but may include information such as address, phone number, references, and income. Input data is described in more detail by reference to FIG. 3.

The database 106 represents at least one database, which may contain at least a portion of the requisite data for a particular applicant. The data stored on the at least one database 106 could have been obtained on any previous entry-date for any reason. The at least one database 106 is described in more detail by reference to FIG. 3.

The processing modules 104, generally include routines, programs, objects, components, data structures, etc., that perform particular functions or implement particular abstract data types. The processing modules may be incorporated in any type of software including, but not limited to, customer-relations management software ("CMR") that could be used by a representative or an applicant through an internet-based user-interface. Upon command of a user, the processing modules 104 identify the requisite data in the at least one database 106 and the remaining requisite data necessary to complete the program application. The processing modules 104 further generate a customized application, substantially populated with requisite data, and send that application to the applicant for execution (verification, acquiescence, for example, by signing the substantially populated application electronically or physically, and return of the substantially populated application) to substantially complete the applicant's role in the application process. The processing modules 104 are described in more detail by reference to FIG. 2.

The processing modules transform the input data 102 and the data from the at least one database 106 to a substantially populated, customized application 108. The application is substantially populated with the requisite data that is found in the at least one database 106 and input data 102. This result is useful because the substantially populated customized application 108 need only be executed by the applicant and received by the entity to substantially complete the applicant's role in the application process.

Figure 2:
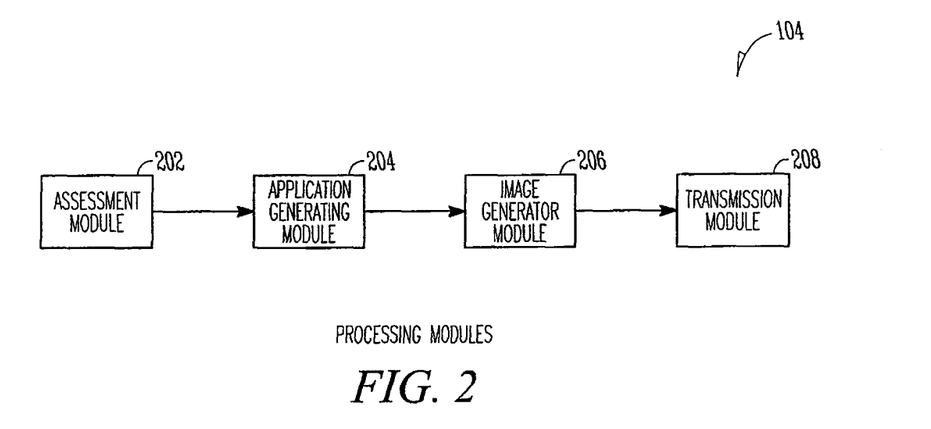
FIG. 2 is a block diagram of processing modules of the system shown in FIG. 1 according to various embodiments.

FIG. 2 is a block diagram of processing modules of the system shown in FIG. 1 according to various embodiments. Processing modules 104 comprise an assessment module 202, an application generating module 204, an image generating module 206, and a transmission module 208.

The assessment module 202 analyzes the data in the at least one database and determines requisite data to be input to complete an application for a particular program. The assessment module 202 is described in more detail by reference to FIG. 3.

The application generating module 204 generates an application for a particular program that is substantially populated with the requisite data. The application that is generated may be formatted according to the requisite data and to the particular program being applied for.

The image generator module 206 provides an image of the generated application. This image may be an electronic image or a physical copy, for example.

The transmission module 208 transmits the image of the application to the applicant. The transmission of the image is any transmission that provides the applicant with an opportunity to view the image of the application (e.g., email, facsimile, postal service, or personal pick-up).

Figure 3:
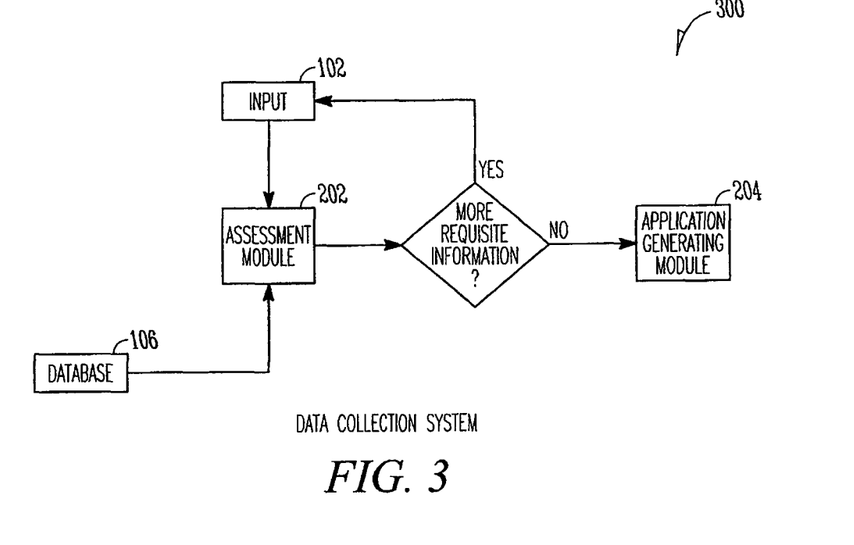
FIG. 3 is a flow diagram illustrating a data collection system according to various embodiments.

FIG. 3 is a block diagram illustrating a data collection system 300 according to various embodiments. The diagram comprises the input data 102, the database, 106, the assessment module 202, and the application generating module 204.

Figure 4:
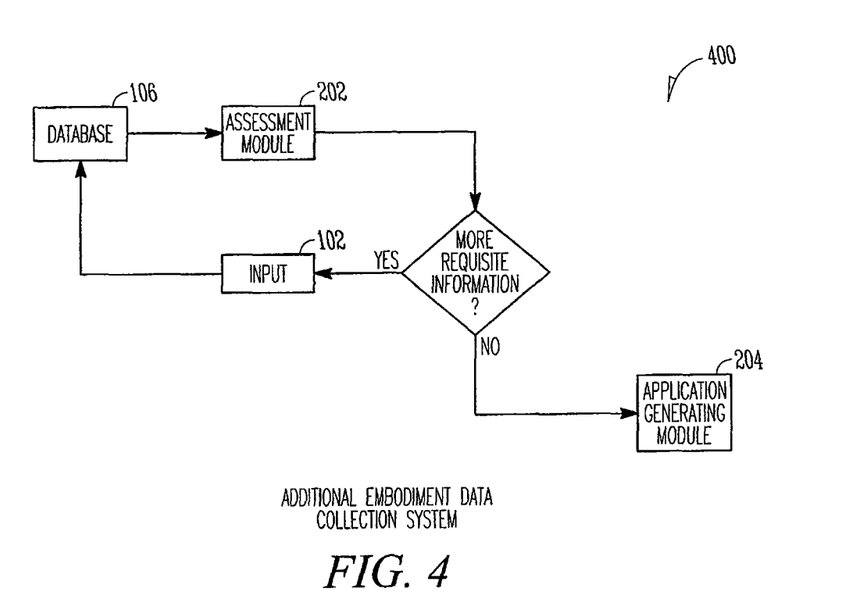
FIG. 4 is an alternative flow diagram illustrating the data collection system according to various embodiments.

The assessment module 202 identifies the requisite data in the at least one database 106 and further identifies requisite data not present in the at least one database. The assessment module 202 can utilize logic programming, for example, to identify such requisite data. Once the assessment module 202 identifies requisite data not present in the at least one database, it provides an opportunity for data input 102. The input data 102 is entered in the at least one database 106, either by being entered into the at least one database 106 by the assessment module 202, or, in an alternative embodiment, by being directly entered into the at least one database, represented in FIG. 4. After data input 102, the assessment module 202 once again analyzes the data that has been obtained either through data input 102 or in at least one database 106, and provides another opportunity for data input 102. This programming loop continues until all of the requisite data has been obtained, at which point the information is passed to the application generating module 204.

In at least one embodiment, it is possible that some data may be optional for an application process, but not requisite. In such a situation, the assessment module 202 may provide an opportunity for input of that optional data. If that data is not entered, the assessment module 202 may still exit the programming loop and pass the information on to the application generating module 204.

Methods

In this section, particular methods of example embodiments are described by reference to a series of flow charts. The methods to be performed constitute a computer program made up of computer-executable instructions.

Figure 5:
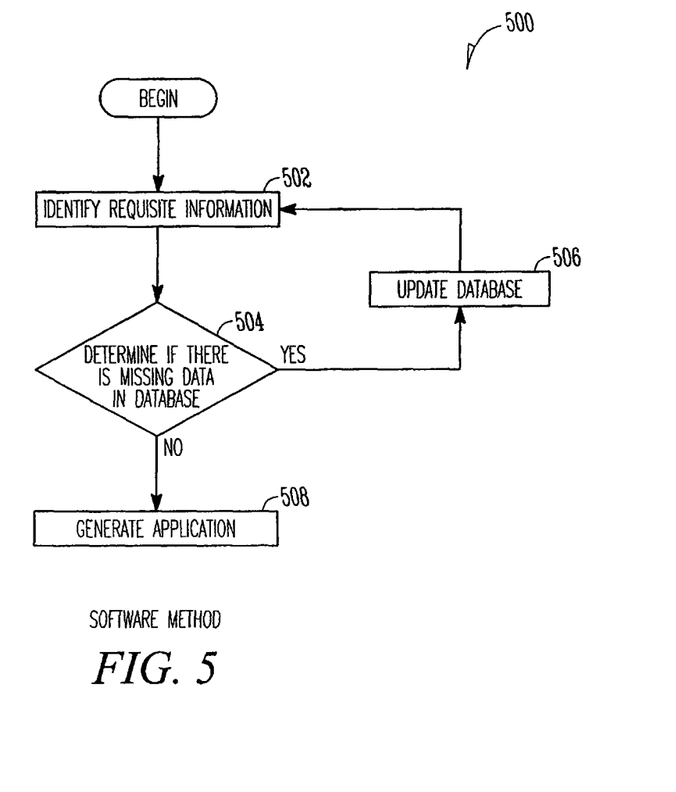
FIG. 5 is a flow diagram of a method to be performed by a computer to generate a substantially populated application according to according to various embodiments.

FIG. 5 is a flow diagram of a method to be performed by a computer to generate a substantially populated application 500 according to various embodiments. The method comprises identifying requisite information 502, determining if there is missing data in the database 504, if so, updating the database 506, and if not, generating an application 508.

The requisite data for the particular program is identified 502, and, by way of example, this may be accomplished though a user choosing a particular program using a user interface, or by the software determining an appropriate program based on applicant data in at least one database. After the requisite data is identified 502, the software identifies requisite data that is already contained in at least one database 504.

If additional requisite data is needed, the software provides an opportunity to update the at least one database until all of the requisite data is obtained 506. The software may provide an opportunity for at least one initial update 506 to first identify applicant data in the at least one database, and determine whether there is requisite data missing from the at least one database 504.

Once the software determines that there is no missing requisite data in the at least one database 504, an application is generated 508. The application is substantially populated with requisite data and may be formatted according to the particular program, or the type of requisite data. The application may be in any format that is viewable to an applicant, such as an electronic document, or physical document.

This method 500 is useful because, in addition to eliminating the need for the applicant to physically fill out an application, an application is not generated until all requisite data has been obtained, providing verification that the application has been fully completed.

Example Implementations

Various examples of systems and methods for embodiments of the inventive subject matter have been described above.

Figure 6:
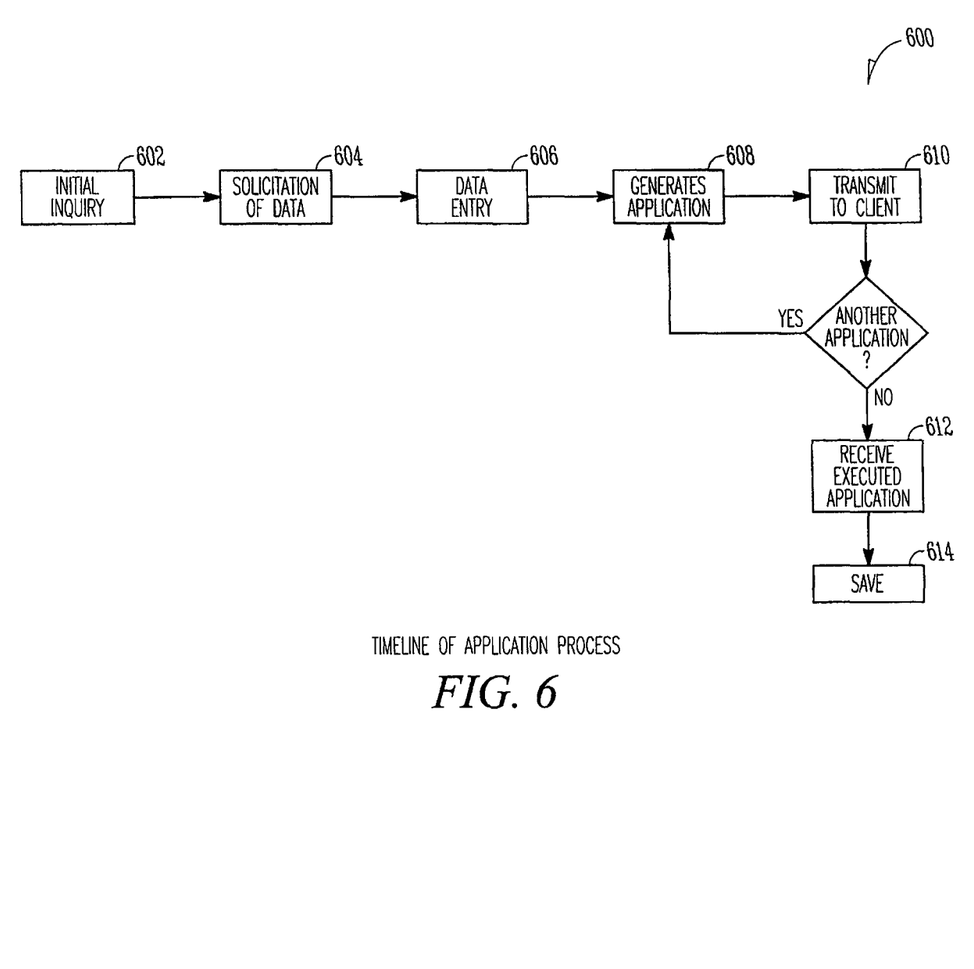
FIG. 6 is a flow diagram of the application process according to an example embodiment.

FIG. 6 is a diagram of the application process according to an example embodiment. The process comprises an initial inquiry 602, solicitation of data 604, data entry 606, generates application 608, transmits to client 610, receives an executed application 612, and a save 614.

Either the applicant or a representative can make an initial inquiry 602 regarding interest in a life insurance policy. The initial inquiry 602 may take place over a telephone conversation, email, mail, website, or any other medium for applicant-representative communication.

Following the initial inquiry 602, information is solicited 604 from the applicant to collect requisite life insurance application data. The requisite data may be identified, for example, by a computer program through a user interface, or by a representative herself, and may include data such as Social Security Number of the applicant, beneficiaries of the policy, phone number, address, and general health inquiries, for example.

The solicited information 604 is entered into at least one database 606 until all requisite data is obtained to fulfill an application for the particular life insurance policy. If the entity offers other types of insurance policies, and the applicant had participated in or applied for at least one of those policies in the past, requisite data may have been previously obtained at some point and already be present in the at least one database. That requisite data may not need to be re-entered.

Once all requisite data is collected, a substantially populated customized application is generated 608 based on the requisite data and appropriate for the particular life insurance policy. The application may be generated 608 once requested by a user through a user interface, for example.

After the application has been generated 608, it is then transmitted 510 to the applicant for execution. The transmittal 610 of the substantially populated application can be through email, mail, fax, or any other method that allows the applicant to view the substantially populated application and execute it. The generated 608 application may not be saved prior to its transmittal 610, so as not to take up a limited storage capacity, and so if the application needs to be resent for any reason to an applicant, it is regenerated 608 and retransmitted 610. This may occur, for example, in situations where the applicant loses or destroys the application or transmittal 610 is unsuccessful. After the application has been transmitted 610 successfully to the applicant and an executed copy is received 612 by the entity, a copy is retained and saved 614 for entity records.

Hardware and Operating Environment

This section provides an overview of example hardware and operating environments, in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed below regarding FIG. 7.

Figure 7:
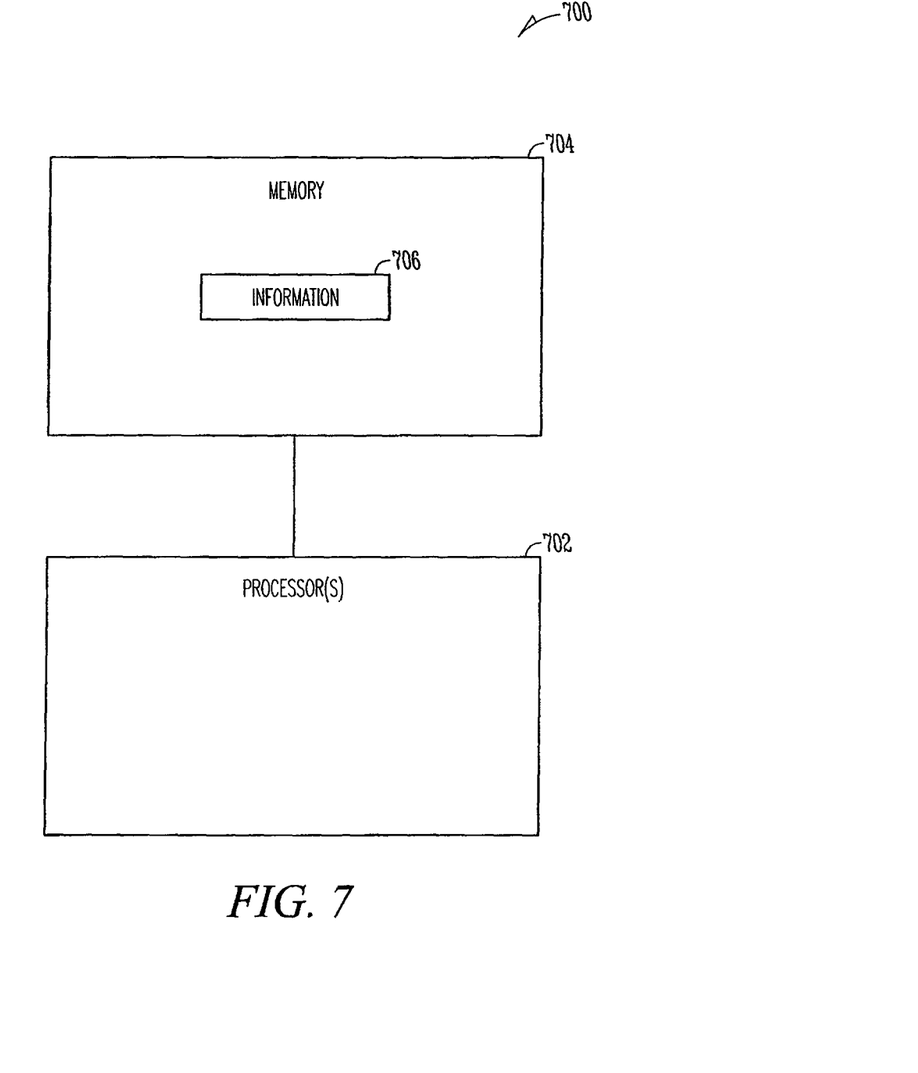
FIG. 7 is a block diagram of an article according to various embodiments.

FIG. 7 is a block diagram of an article 700 according to various embodiments. Such embodiments may comprise a computer, a memory system, a magnetic or optical disk, some other storage device, or any type of electronic device or system. The article 700 may include one or more processor(s) 702 coupled to a machine-accessible medium such as a memory 704 (e.g., a memory including electrical, optical, or electromagnetic elements). The medium may contain associated information 706 (e.g., computer program instructions, data, or both) which, when accessed, results in a machine (e.g., the processor(s) 706) performing the activities previously described herein.

Implementing the apparatus, systems, and methods disclosed herein provide the useful, concrete, tangible result of simplifying and expediting the application process. The application is customized and populated with requisite data, including requisite data that had been obtained and stored in at least one database at any time in the past, for any reason. For example, if an applicant is participating or has participated in another program offered by the entity, a substantial portion of the requisite data for a new application may already be contained in at least one database and be retrieved by a processor. Applicant's duty in the application process may be to execute and return the customized, substantially populated application to the entity to commence a program. The apparatus, systems, and methods described herein may be used for customizing applications and expediting the application process.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A non-transitory computer readable medium comprising at least one computer-readable instruction for generating applications, the at least one computer-readable instruction being executed by a computer having a processor and comprising instructions for:

receiving a service program request, wherein processing the service program request is configured to automatically populate a plurality of fields of an application with user information for a respective user;

accessing at least one database comprising previously-obtained user information for the respective user;

determining, using the processor, that the previously-obtained user information of the at least one database comprises only a subset of requisite data and only a subset of optional data such that there is missing requisite data and missing optional data associated with the respective user;

identifying the missing requisite data and the missing optional data;

inputting additional requisite data into the at least one database and iterating back in order to access the at least one database to determine whether there is missing requisite data associated with the respective user to process the service program request;

providing an opportunity to enter the missing optional data; and only after determining that there is no missing requisite data but that there is still missing optional data, providing application information from the at least one database to the processor;

generating, using the processor, a completed application comprising the plurality of fields, wherein the plurality of fields comprise customized fields that are automatically populated with all of requisite data associated with the respective user necessary to process the service program request and the subset of optional data; and transmitting the completed application to the respective user.

2. The computer-readable medium of claim 1, the computer-readable medium further storing instructions for receiving a command from a user interface to identify the requisite data based on the previously-obtained information in the at least one database.

3. The computer-readable medium of claim 1, the computer-readable medium further storing instructions for generating an image of the application.

4. The computer-readable medium of claim 3, the computer-readable medium further storing instructions for transmitting the image of the application.

5. The computer-readable medium of claim 3, the computer-readable medium further storing instructions for receiving a command from a user interface to generate an image of the application.

6. The computer-readable medium of claim 1, the computer-readable medium further storing instructions for requesting additional requisite data and updating the at least one database.

7. The computer-readable medium of claim 1, the computer-readable medium further storing instructions for formatting the application based on the requisite data.

8. The computer-readable medium of claim 1, wherein generating the completed application comprises generating a life insurance policy application.

9. The computer-readable medium of claim 1, the computer-readable medium further storing instructions for:
upon obtaining the service program request, determining, using the processor, an appropriate service program from a plurality of service programs based on the previously obtained user information in the at least one database, wherein the appropriate service program is a service program for which there is no missing requisite data based on the previously obtained user information; and
selecting the appropriate service program to process in response to the service program request.

10. The computer-readable medium of claim 1, wherein the completed application comprises an application for insurance.

11. The computer-readable medium of claim 1, wherein the computer-readable instructions comprise instructions for providing an indication that missing requisite data is required when the additional requisite data does not comprise all of the missing requisite data.

12. The computer-readable medium of claim 1, wherein the completed application is generated by executing computer-readable instructions to exit a programming loop even when the optional data is not entered.

13. The computer-readable medium of claim 1, wherein the user information for the respective user is stored in a database until all of the missing requisite data is obtained.

14. An application generation processor-implemented method, comprising:
receiving a service program request, wherein processing the service program request is configured to automatically populate a plurality of fields of an application with user information for a respective user;

accessing at least one database comprising previously-obtained user information for the respective user;

determining, using a processor of a computer, that the previously-obtained user information of the at least one database comprises only a subset of requisite data and only a subset of optional data such that there is missing requisite data and missing optional data associated with the respective user;

identifying the missing requisite data and the missing optional data;

inputting additional requisite data into the at least one database, and iterating back in order to access the at least one database to determine whether there is missing requisite data associated with the respective user to process the service program request;

providing an opportunity to enter the missing optional data; and only after determining that there is no missing requisite data, but that there is still missing optional data, providing application information from the at least one database to the processor;

generating, using the processor, a completed application comprising the plurality of fields, wherein the plurality of fields comprise customized fields that are automatically populated with all of requisite data associated with the respective user necessary to process the service program request and the subset of optional data; and transmitting the completed application to the respective user.

15. The method of claim 14, further comprising:
receiving a command from a user interface to identify the requisite data based on the previously-obtained information in the at least one database.

16. The method of claim 14, further comprising:
generating an image of the completed application.

17. The method of claim 16, further comprising:
receiving a command from a user interface to generate an image of the completed application.

18. The method of claim 14, wherein generating completed application comprises generating a life insurance policy application.

19. An application generation system, comprising:
a processor; and
a memory disposed in communication with the processor and storing processor executable instructions to:
activate a service program request, wherein processing the service program request by the processor is configured to automatically populate a plurality of fields of an application with user information for a respective user and wherein the service program request is selected by the system based on previously-obtained user information comprising the user information for the respective user;

access at least one database comprising the previously-obtained user information comprising the user information for the respective user, wherein the previously-obtained user information was submitted by the respective user for an alternative service program;

determine, using the processor, that the previously-obtained user information of the at least one database comprises only a subset of requisite data and only a subset of optional data such that there is missing requisite data and missing optional data associated with the respective user;

identify the missing requisite data and the missing optional data;

input additional requisite data into the at least one database and iterate back in order to access the at least one database to determine whether there is missing requisite data associated with the respective user to process the service program request;

provide an opportunity to enter the missing optional data; and only after determining that there is no missing requisite data but that there is still missing optional data, provide application information from the at least one database to the processor;

generate, using the processor, a completed application comprising the plurality of fields, wherein the plurality of fields comprise customized fields that are automatically populated with all of requisite data associated with the respective user necessary to process the service program request and the subset of optional data; and transmit the generated application to the respective user.

20. The system of claim 19, the memory further storing instructions to:

receive a command from a user interface to identify the requisite data based on the previously-obtained information in the at least one database.

21. The system of claim 19, the memory further storing instructions to:

request additional requisite data and updating the at least one database.

22. The system of claim 19, the memory further storing instructions to:

verify that the completed application has been generated.

\* \* \* \* \*